May 16, 1950     G. W. DAGGETT     2,507,758
POWER MOWER UNIT

Filed Oct. 29, 1947     5 Sheets-Sheet 1

Inventor
G.W. Daggett
By Kimmel & Crowell Attorneys

May 16, 1950     G. W. DAGGETT     2,507,758
POWER MOWER UNIT

Filed Oct. 29, 1947     5 Sheets-Sheet 3

Inventor
G. W. Daggett
By Kimmel & Crowell
Attorneys

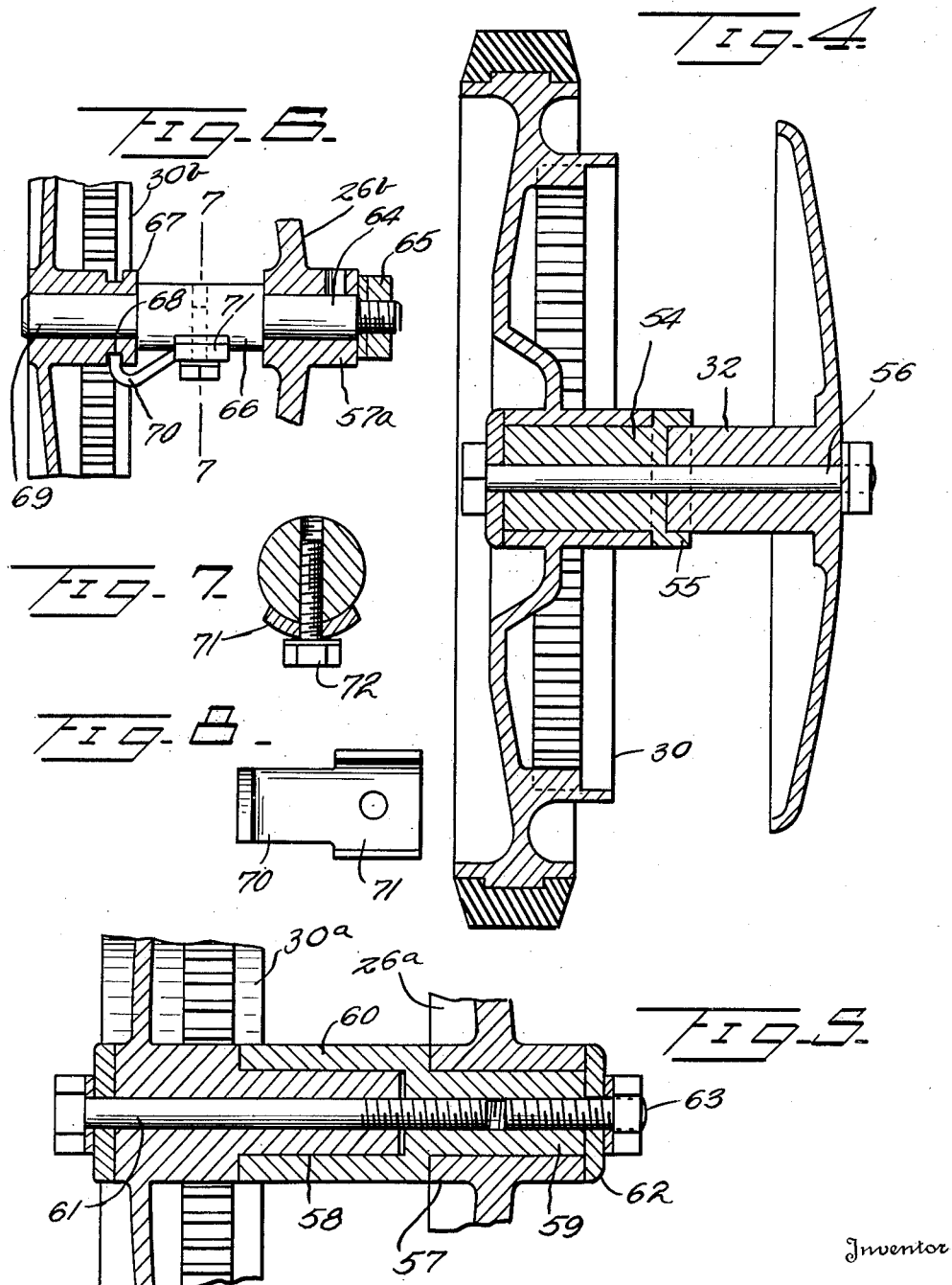

May 16, 1950 G. W. DAGGETT 2,507,758
POWER MOWER UNIT
Filed Oct. 29, 1947 5 Sheets-Sheet 5
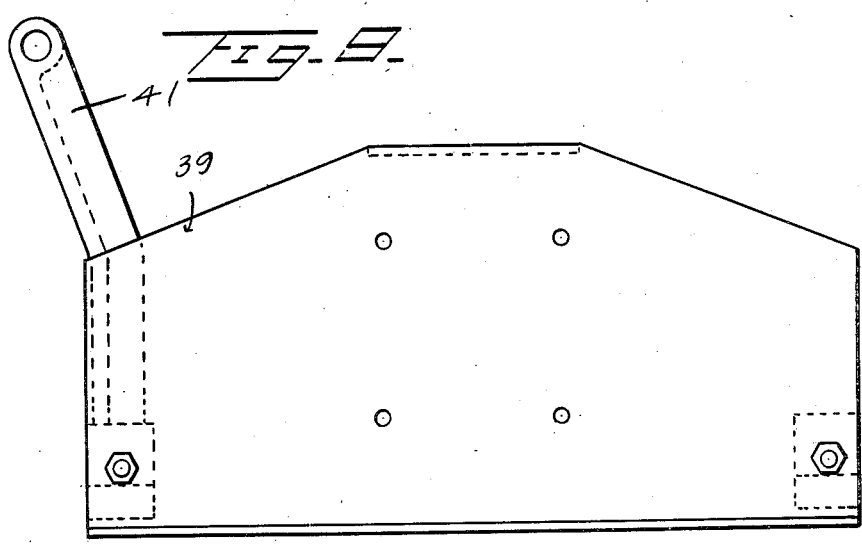
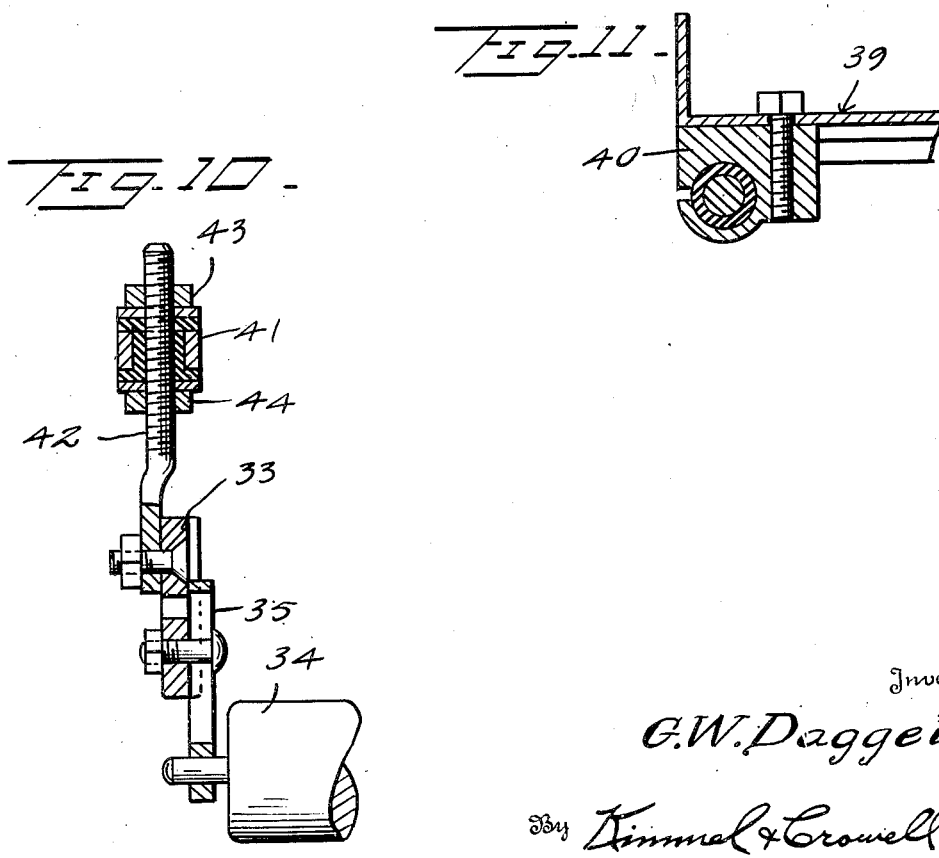
Inventor
G. W. Daggett
By Kimmel & Crowell
Attorneys Patented May 16, 1950

2,507,758

UNITED STATES PATENT OFFICE 2,507,758

POWER MOWER UNIT

George W. Daggett, Meadville, Pa.

Application October 29, 1947, Serial No. 782,921

3 Claims. (Cl. 56—26)

This invention relates to powered lawnmowers.

An object of this invention is to provide an improved means whereby a conventional hand operated lawnmower may be converted into a powered lawnmower.

Another object of this invention is to provide a conversion unit for a lawnmower whereby the cutting reel may be operated by an internal combustion engine.

A further object of this invention is to provide an improved means whereby the rotary cutting reel may be operatively coupled to the engine, and at least one wheel of the lawnmower may be extended and supported in laterally spaced relation with respect to the frame to provide the necessary space for mounting the driving connections on the reel.

A further object of this invention is to provide an improved stud extension for one wheel of the lawnmower which can be mounted on the present parts of the machine for rotatably supporting one wheel in extended position.

A further object of this invention is to provide an improved power attachment for a conventional lawnmower having a rotary cutting reel so that the hand lawnmower may be readily converted into a powered lawnmower.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 4 is a vertical section of one wheel and mounting for the lawnmower showing the extension means for the wheel mounting.

Figure 5 is a fragmentary sectional view of a modified form of wheel mounting.

Figure 6 is a fragmentary sectional view of another modified form of wheel mounting.

Figure 7 is a sectional view taken on the line 7—7 of Figure 6.

Figure 8 is a top plan of the wheel retainer used in Figures 6 and 7.

Figure 9 is a plan view of the base or platform.

Figure 10 is a fragmentary sectional view taken on the line 10—10 of Figure 2.

Figure 11 is a fragmentary sectional view taken on the line 11—11 of Figure 1.

Figure 1:
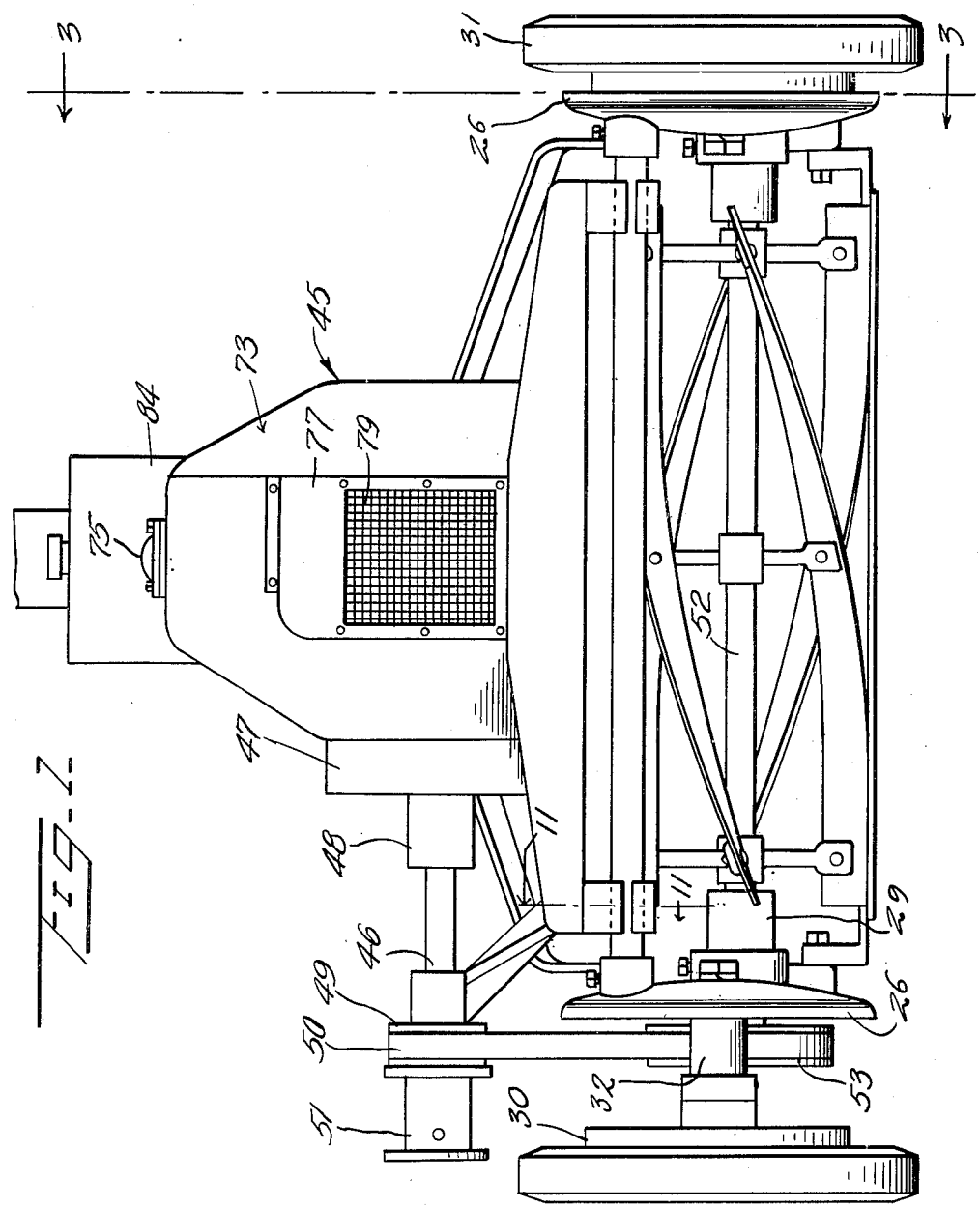
Figure 1 is a detailed front elevation of a lawnmower having a power attachment constructed according to an embodiment of this invention mounted thereon.
Figure 2:
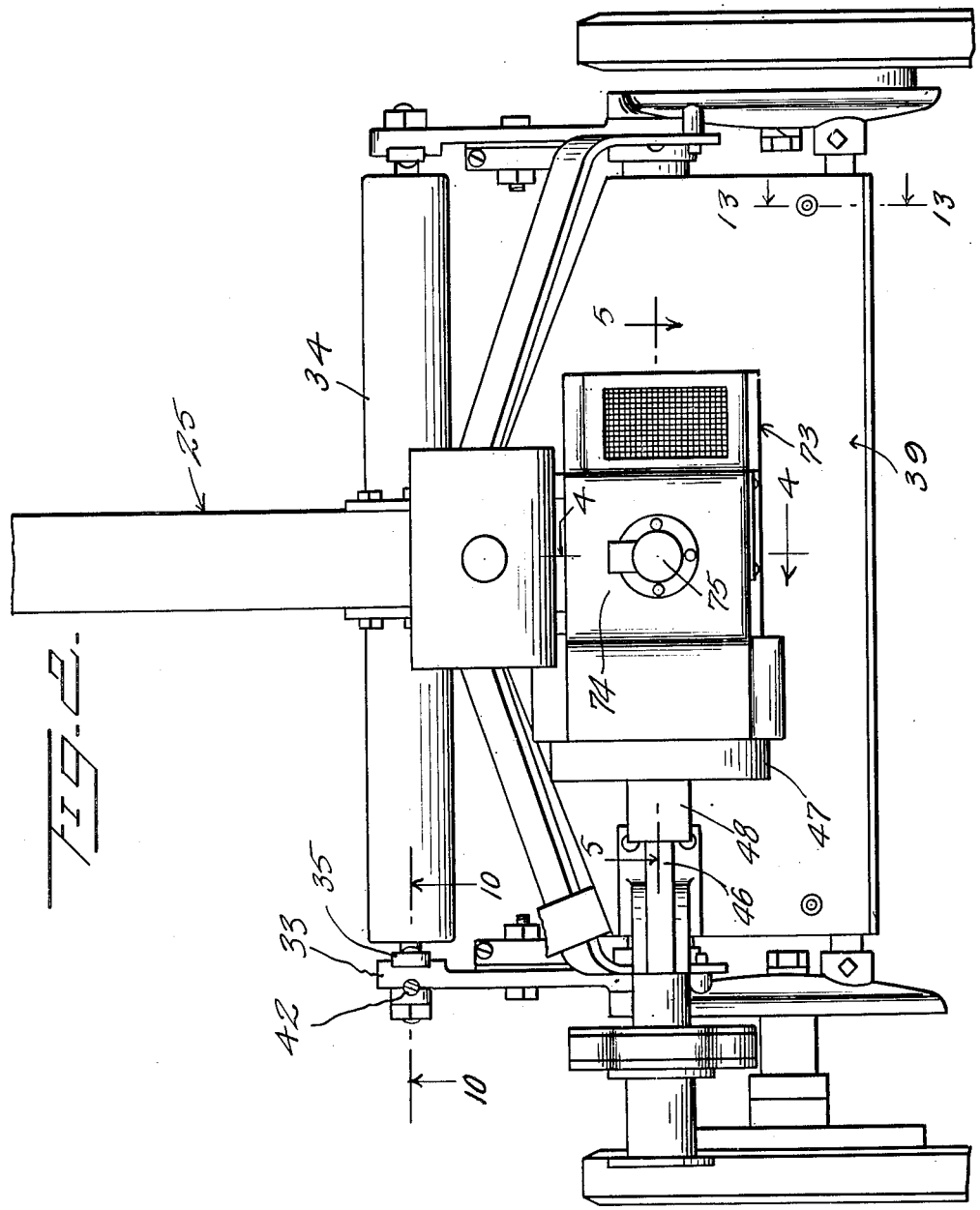
Figure 2 is a detailed plan view of the device.
Figure 3:
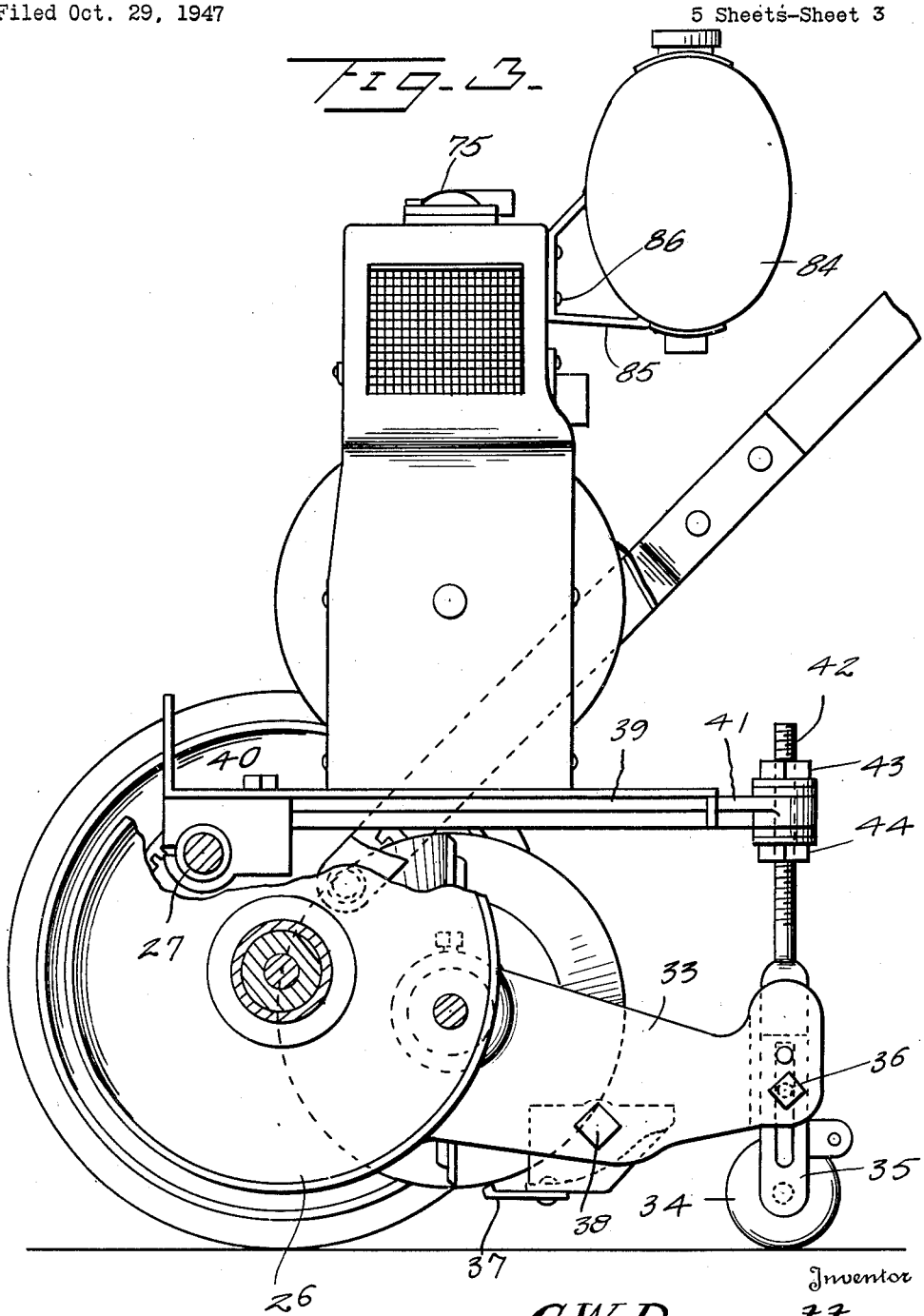
Figure 3 is a sectional view taken on the line 3—3 of Figure 1.

Referring now to the drawings and first to Figures 1 to 11, inclusive, the numeral 25 designates generally a hand operated lawnmower which includes a frame formed of opposite side members 26 which are connected together by a connecting bar 27. The frame also includes a rotary cutting reel generally designated as 28 which is journalled in bearings 29 carried by the side members 26. A pair of wheels 30 and 31 are rotatably carried by the opposite side members 26 being journalled on studs 32 which are carried by the side members 26. Each side member 26 includes a rearwardly extending arm 33 and a roller 34 is rotatably carried by vertically adjustable bracket members 35 which are secured by fastening means 36 to the rear ends of the side arms 33.

The side arms 33 also have secured therebetween a stationary cutting blade 37 which is fixed in adjusted position between the arms 33 by fastening means 38. The lawnmower construction hereinbefore described is of conventional construction and in order to provide a means whereby the reel 28 may be rotated by a power device, I have provided a platform or base 39 which has secured to the forward lower side thereof a pair of clamping blocks 40 which engage the cross bar 27 so as to support the forward end of the platform or base 39. The platform or base 39 also includes a rearwardly extending arm 41 which extends rearwardly and is bent laterally and outwardly as indicated in Figure 11. An upstanding bolt 42 is secured by one of the bracket fastening members 36 to the adjacent arm 33 and extends through the arm 41. The arm 41 is fixed relative to the bolt 42 by means of upper and lower adjusting nuts 43 and 44, respectively.

The base or platform 39 has mounted thereon an internal combustion engine generally designated as 45. A shaft extension 46 is secured relative to the fly wheel 47 of the engine 45 and coplanar with the axis thereof by means of a coupling sleeve 48. The shaft extension has secured thereto a pulley 49 about which a V-belt 50 is trained. The shaft 46 also has fixed thereon a starter pulley 51 which is adapted to be engaged by a starter cord for initially starting rotation of the shaft 46 and the engine 45.

The reel 28 which includes a reel shaft 52 is rotated by the belt 50, the conventional clutched gear which is normally mounted on the shaft 52 being removed and replaced by a grooved pulley 53. The pulley 53 engages on the outer side of an adjacent side member 26 and in order to provide for passage of the belt 50, the wheel 30 is supported in laterally spaced relation to the adjacent side member 26.

Referring now to Figure 4, the stud 32 on which the wheel 30 is normally mounted has secured thereto an extension stud 54 formed with a collar or annular flange 55 engaging about the outer end of the stud 32. A long securing bolt 56 extends through the centers of the studs 32 and 54 for holding the extension stud 54 in aligning position with respect to the stud 32.

Referring now to Figure 5, in certain types of lawnmowers the side members 26a are provided with a bushing 57 within which a reduced stud 58, carried by the wheel 30a, is adapted to rotatably engage. A stud extension is provided as shown in Figure 5 which includes a stud 59 closely engaging in the bushing 57 and formed at its outer end with a sleeve 60 within which the stud 58 is adapted to rotate. A bolt 61 extends through the stud 58 and is threaded into and through the stud 59. A washer 62 and lockwasher is interposed between the nut 63 and the inner end of the bushing 57. The stud 59 is clamped within the bushing 57 and the stud 58 is rotatable withing the stud 60 in the same manner that it did before in bushing 103a before conversion.

Another form of wheel supporting means is shown in Figures 6 to 8. The side member 26b which is similar to the side member 26a, being formed with a bushing 57a, has fixed therein a stud 64. A nut 65 is threaded on the inner end of the stud 64 and the stud 64 has extending from the outer end thereof an extension 66. The wheel 30b is formed with a bushing 67 having an annular groove 68. The extension 66 is formed with an outer stud or shaft 69 which engages in the bushing 67. A retaining key 70 engages in the annular groove 68 and is carried by a transversely arcuate plate 71 secured by fastening means 72 to the intermediate extension stud 66.

The engine 45 is substantially entirely enclosed within a cover or housing 73 which also forms a means whereby the engine may be cooled. The cover 119 includes a vertically disposed housing 120 formed with an opening 121 through which the fly wheel loosely engages. The housing 120 also includes an intake opening 122 on the inner side thereof as shown in Figure 5 so that air may enter the housing 120 and then pass upwardly through a connecting passage 123 to the upper portion of the cylinder 47. The housing 73 also includes a top wall 74 formed with a cap 75 through which a conductor is adapted to be extended for engagement with a spark-plug on the engine 45. The forward wall 76 of the housing or cover 73 has secured thereto a plate 77 which is secured to the front wall 76 by fastening means 78. The plate 77 is provided with a screen 79 so that the air may be drawn into the housing 73. The cover or housing 73 also includes a rear plate 80 and a laterally disposed housing 81 formed with an inclined upper wall 82 having a screen 83 mounted therein for the discharge of the heated cooling air. The housing 81 is adapted to enclose a battery B and other accessories associated with the engine. A fuel tank 84 is supported on the rear side of the cover or housing 73 being secured with a pair of supporting brackets 85 which are secured by fastening means 86 to the rear wall of the housing 73.

In the use and operation of this lawnmower the engine 45 is started by wrapping a starter cord about the starter pulley 51. The engine 45 will rotate the cutting reel 28 continuously and it will be understood that the powered lawnmower will be manually moved over the surface of the ground. With a construction as hereinbefore described a conventional lawnmower which is hand operated may be converted into a powered lawnmower by mounting the engine and accessories carried by the engine and the base 39 on the lawnmower frame and extending at least one of the traction wheels of the lawnmower laterally of the adjacent side member 26 to provide for connection between the cutting reel and the engine shaft.

I claim:

1. In a lawnmower formed of a frame having opposite side members, a cross bar connecting said side members together, a cutting reel journalled between said side members, and a pair of wheels rotatably carried by said side members; a power attachment for rotating said reel, said attachment comprising a base, means securing the forward portion of said base to said cross bar, means securing the rear portion of said base to one of said side members, a power member carried by said base, means offsetting one of said wheels relative to an adjacent side member, said means including a stud fixedly carried by said adjacent side member, a reduced diameter outer portion on said stud journalled in the hub of said one wheel, an annular groove formed in the outer surface of said hub, an outwardly and upwardly hooked bar carried by said stud and engaging in said groove for preventing axial movement of said one wheel, a pulley fixed relative to said reel and disposed between said one wheel and said adjacent side member, and a flexible driving connection between said power member and said pulley.

2. In a lawn mower having a frame formed of opposite side members, a connecting bar fixed between said side members, a pair of wheels rotatably carried by said side members, and a cutting reel between said side members and operatively connected to one of said wheels; a power attachment for rotating said reel, said attachment comprising a base member, means supporting said base member on said frame, an extension stud fixed to one of said side members for rotatably supporting the other of said wheels in laterally spaced relation to said one side member, said extension stud including a reduced diameter outer portion extending rotatably through the hub of said other wheel, a plate carried by said stud and having an outwardly and upwardly hooked portion formed thereon, an annular groove formed in the hub of said other wheel and adapted to receive said hooked portion for preventing axial movement of said other wheel relative to said one side member, a power member carried by said base, and operative connecting means between said power member and said reel extending in the space between said other wheel and said one side member.

3. The combination of a lawn mower having a frame including opposite rearwardly extending side members, a cross bar connecting the forward portions of said side members together, a cutting reel journalled between said side members, and a pair of wheels rotatably carried by said side members; and a power attachment for rotating said reel comprising a flat base member, a rearwardly extending support arm carried by said base member, a vertical bore in said arm; a depending bolt slidable in said bore and secured to the underlying side member; means disposed above and below said support arm and threadably engaging said bolt for adjusting said bolt relative to said arm; a pair of depending brackets carried by the forward edge of said loose member, said brackets being formed with horizontal slotted bores extending therethrough and adapted to receive said cross bar, a power member on said base, extension means for rotatably supporting one of said wheels in laterally spaced relation to the adjacent side member, said extension means including a stud member having reduced diameter portions at the opposite ends thereof, one of said portions being fixedly carried by said adjacent side member, the other of said portions being rotatably received within the hub of said one wheel, an external annular groove formed in said hub, a hooked key member carried by said stud and slidably engaging in said groove for preventing axial movement of said one wheel, a pulley fixed relative to said reel and disposed in the space between said one wheel and said adjacent side member, and a flexible driving connection between said power member and said pulley.

GEORGE W. DAGGETT.

REFERENCES CITED

The following references are of record in the file of this patent:

UNITED STATES PATENTS

| Number | Name | Date |
|---|---|---|
| 1,186,299 | Eighmie | June 6, 1916 |
| 1,722,730 | Buday | July 30, 1929 |
| 2,066,174 | Cregier | Dec. 29, 1936 |
| 2,179,683 | Brebeck | Nov. 14, 1939 |
| 2,253,899 | Duemler | Aug. 26, 1941 |